United States Patent
Tsai et al.

(10) Patent No.: US 12,395,939 B1
(45) Date of Patent: Aug. 19, 2025

(54) WEARABLE DEVICE, SENSING DATA TRANSMITTING METHOD, AND NON-TRANSITORY COMPUTER READABLE STORAGE MEDIUM THEREOF

(71) Applicant: HTC Corporation, Taoyuan (TW)

(72) Inventors: Ya Lun Tsai, Taoyuan (TW); Cheng-Han Hsieh, Taoyuan (TW); Chen-Si Dai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/583,817

(22) Filed: Feb. 21, 2024

(51) Int. Cl.
*G06F 3/041* (2006.01)
*G06F 3/03* (2006.01)
*G06F 3/038* (2013.01)
*H04W 52/02* (2009.01)

(52) U.S. Cl.
CPC ...... *H04W 52/0254* (2013.01); *G06F 3/0304* (2013.01); *G06F 3/0383* (2013.01); *G06F 3/04162* (2019.05); *G06F 3/0418* (2013.01); *G06F 2203/0331* (2013.01); *G06F 2203/0384* (2013.01)

(58) Field of Classification Search
None
See application file for complete search history.

(56) References Cited

U.S. PATENT DOCUMENTS

| | | | |
|---|---|---|---|
| 2016/0105795 A1* | 4/2016 | Hou | H04M 1/72412 455/39 |
| 2016/0119530 A1* | 4/2016 | Chen | G06F 3/00 348/211.6 |
| 2016/0125677 A1* | 5/2016 | Williams | G04G 21/02 340/5.81 |

* cited by examiner

*Primary Examiner* — Joseph R Haley
(74) *Attorney, Agent, or Firm* — CKC & Partners Co., LLC

(57) ABSTRACT

A wearable device, sensing data transmitting method, and non-transitory computer-readable recording medium thereof are provided. The wearable device determines whether a plurality of motion sensing values exceed a first threshold to determine whether the wearable device is in an active state or an inactive state. In response to the wearable device being in the active state, the wearable device transmits a sensing data to an external device through a wireless communication connection, the sensing data includes the motion sensing values. In response to the wearable device being in the inactive state, the wearable device does not transmit the sensing data to the external device and does not turn off a motion sensor of the wearable device.

18 Claims, 4 Drawing Sheets

WEARABLE DEVICE, SENSING DATA TRANSMITTING METHOD, AND NON-TRANSITORY COMPUTER READABLE STORAGE MEDIUM THEREOF

BACKGROUND

Field of Invention

The present invention relates to a wearable device, sensing data transmitting method, and non-transitory computer-readable recording medium thereof. More particularly, the present invention relates to a wearable device, sensing data transmitting method, and non-transitory computer-readable recording medium thereof that can dynamically adjust the mode of transmitting sensing data.

Description of Related Art

In recent years, various technologies related to virtual reality have developed rapidly, and various related technologies and applications have been proposed one after another.

In the prior art, a wearable device can regularly transmit sensing data corresponding to the user to a computing device (e.g., a head-mounted display, a computer), so that the computing device can perform corresponding data calculations.

However, in the prior art, when the user is in a relatively static state, the wearable device still transmits a large amount of sensing data with only slight movements (i.e., motion sensing values approaching zero) to the computing device for calculation. In this case, the transmission resources and computing resources of the wearable device will be consumed, and the computing device will consume computing resources. Since the wearable device is usually a small-capacity power device, the standby time of the wearable device will be reduced.

In addition, even if the existing technology has a mechanism to turn off the wearable device. However, under such a mechanism, the functions in the wearable device are deactivated, the sensors of the wearable device will be turned off, and the connection between the wearable device and the computing device will be interrupted. In such a case, all functions within the wearable device need to be re-enabled the next time the wearable device is restarted. Since the wearable device and the computing device need to be re-paired and take extra connection time, and the sensor requires extra startup time, the wearable device takes a long time to recover, thus reducing the user's service experience.

Accordingly, there is an urgent need for a technology that can dynamically adjust the mode of transmitting sensing data.

SUMMARY

An objective of the present disclosure is to provide a wearable device. The wearable device comprises a motion sensor, a transceiver interface, and a processor, and the processor is electrically connected to the transceiver interface and the motion sensor. The motion sensor is configured to generate a plurality of motion sensing values. The transceiver interface is configured to connect to an external device through a wireless communication connection. The processor determines whether a plurality of motion sensing values exceed a first threshold to determine whether the wearable device is in an active state or an inactive state. The processor transmits a sensing data to the external device through the wireless communication connection in response to the wearable device being in the active state, wherein the sensing data comprises the motion sensing values. The processor not transmits the sensing data to the external device and not turns off the motion sensor in response to the wearable device being in the inactive state.

Another objective of the present disclosure is to provide a sensing data transmitting method, which is adapted for use in an electronic apparatus. The electronic apparatus comprises a motion sensor, the motion sensor is configured to generate a plurality of motion sensing values, and the electronic apparatus is connected to an external device through a wireless communication connection. The sensing data transmitting method comprises the following steps: determining whether a plurality of motion sensing values exceed a first threshold to determine whether the electronic apparatus is in an active state or an inactive state; transmitting a sensing data to the external device through the wireless communication connection in response to the electronic apparatus being in the active state, wherein the sensing data comprises the motion sensing values; and not transmitting the sensing data to the external device and not turning off the motion sensor in response to the electronic apparatus being in the inactive state.

A further objective of the present disclosure is to provide a non-transitory computer readable storage medium having a computer program stored therein. The computer program comprises a plurality of codes, the computer program executes a sensing data transmitting method after being loaded into an electronic apparatus. The electronic apparatus comprises a motion sensor, the motion sensor is configured to generate a plurality of motion sensing values, the electronic apparatus is connected to an external device through a wireless communication connection, and the sensing data transmitting method comprises: determining whether a plurality of motion sensing values exceed a first threshold to determine whether the electronic apparatus is in an active state or an inactive state; transmitting a sensing data to the external device through the wireless communication connection in response to the electronic apparatus being in the active state, wherein the sensing data comprises the motion sensing values; and not transmitting the sensing data to the external device and not turning off the motion sensor in response to the electronic apparatus being in the inactive state.

According to the above descriptions, the sensing data transmitting technology (at least including the wearable device, the method, and the non-transitory computer readable storage medium) provided by the present disclosure determines whether the wearable device is in an active state or an inactive state through the motion sensing value generated by the motion sensor. The sensing data transmitting technology provided in the present disclosure determines whether to transmit sensing data to an external device through a wireless communication connection in response to the wearable device being in the active state or the inactive state. The sensing data transmitting technology provided by the present disclosure can reduce the consumption of transmission resources and computing resources of the wearable device and improve the standby time of the wearable device. In addition, since the sensing data transmitting technology provided by the present disclosure does not require restarting the wearable device, the wearable device does not require additional recovery time (For example: the response time of the wearable device 1 can be less than 0.5 seconds), which improves the user's service experience.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a wearable device, sensing data transmitting method, and non-transitory computer-readable recording medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
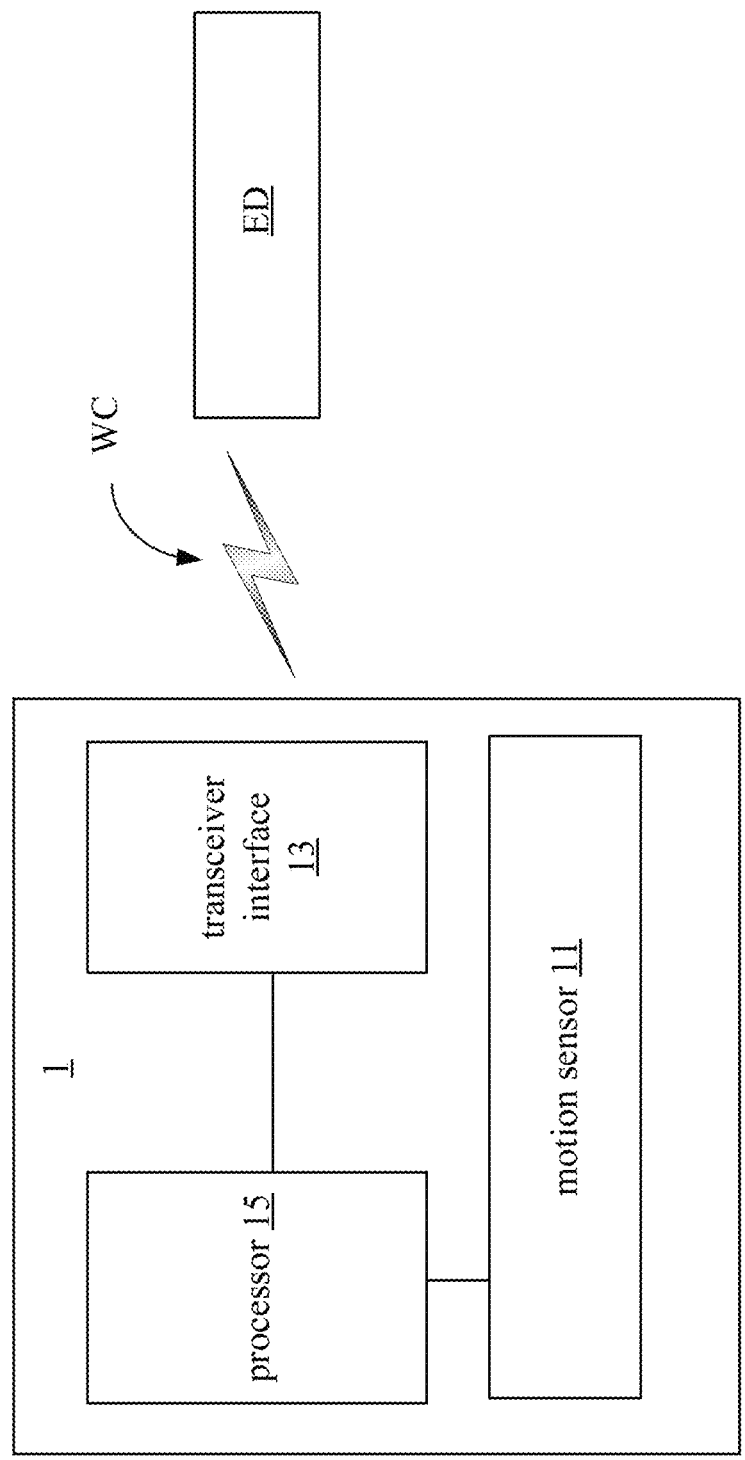
FIG. 1 is a schematic diagram depicting the structure of the wearable device of the first embodiment.

The first embodiment of the present disclosure is a wearable device 1, the schematic structural diagram of which is depicted in FIG. 1. In the present embodiment, the wearable device 1 comprises a motion sensor 11, a transceiver interface 13, and a processor 15. The processor 15 is electrically connected to the transceiver interface 13 and the motion sensor 11.

In the present embodiment, the user uses the wearable device 1 to perform input operations such as control, pressing, dragging, etc., and the wearable device 1 performs corresponding operations of sensing/tracking actions. In some embodiments, the wearable device 1 may be a smart ring.

In some embodiments, the wearable device 1 can also be a smart bracelet or a smart watch.

It shall be appreciated that the motion sensor 11 is configured to generate a plurality of motion sensing values. The motion sensor 11 can be any sensor that can detect motion sensing values corresponding to the user's use of the wearable device 1.

In some embodiments, the motion sensor 11 may be an inertial sensor, the inertial sensor may continuously generate a sequence of a plurality of inertial measurement parameters (for example, an inertial measurement parameter stream generated at a frequency of 10 times per second). It shall be appreciated that each of the inertial measurement parameters may include, for example, an acceleration, a rotation amount, and an angular acceleration.

It shall be appreciated that the transceiver interface 13 is an interface capable of receiving and transmitting data or other interfaces capable of receiving and transmitting data and known to those of ordinary skill in the art. The processor 15 may be any of various processors, Central Processing Units (CPUs), microprocessors, digital signal processors or other computing apparatuses known to those of ordinary skill in the art.

As shown in FIG. 1, the transceiver interface 13 can be directly connected to the external device ED through the wireless communication connection WC. In some embodiments, the wireless communication connection WC may be a Bluetooth communication connection.

In some embodiments, the wireless communication connection WC may be a Bluetooth Low Energy (BLE) communication connection or a Wi-Fi wireless network connection.

In some embodiments, the external device ED may be a head-mounted display (HMD) or a device with computing capabilities (such as a computer).

In the present embodiment, the processor 15 determines whether a plurality of motion sensing values exceed a first threshold to determine whether the wearable device 1 is in an active state or an inactive state.

For example, the processor 15 can determine whether the motion sensing values in the corresponding time interval exceed the first threshold through a sliding window. When the motion sensing values in the time interval exceed the first threshold, the wearable device 1 is determined to be in an active state. When the motion sensing values in the time interval do not exceed the first threshold, the wearable device 1 is determined to be in an inactive state.

In response to the wearable device 1 being in the active state, the processor 15 transmits a sensing data to the external device ED through the wireless communication connection WC, wherein the sensing data comprises the motion sensing values.

For example, when the wearable device 1 is in the active state, the processor 15 may transmit the motion sensing values sensed by the wearable device 1 to the external device ED through the wireless communication connection WC (e.g., the Bluetooth communication connection) based on a transmission interval length or a transmission frequency (e.g., once every 10 ms).

In response to the wearable device 1 being in the inactive state, the processor 15 does not transmit the sensing data to the external device ED, and does not turn off the motion sensor 11.

It shall be appreciated that when the wearable device 1 is in the inactive state, the wireless communication connection WC is not disconnected, but only needs to transmit the minimum connection data (for example: the minimum transmission data for maintaining connection in the Bluetooth communication connection).

In some embodiments, the processor 15 can also dynamically adjust the frequency of sensing data transmission based on the frequency of change of the motion sensing values. Specifically, the processor 15 determines a first data state of the motion sensing values in response to the wearable device 1 being in the active state, wherein the first data state is configured to indicate a frequency of change of the motion sensing values. Next, the processor 15 dynamically adjusts a transmission interval length of the sensing data based on the first data state.

For example, when the processor 15 determines that the user is in a relatively strenuous motion state, the processor 15 increases the transmission frequency of transmitting the sensing data (i.e., reduces the transmission interval length of the sensing data) through the wireless communication connection WC (e.g., the Bluetooth communication connection). When the processor 15 determines that the user is in a relatively calm motion state, the processor 15 reduces the transmission frequency of transmitting the sensing data through the wireless communication connection WC (i.e., increases the transmission interval length of the sensing data).

Please refer to Table 1 below for a schematic diagram of battery standby time corresponding to different transmission interval lengths.

TABLE 1

| transmission interval length | Drain Voltage of processor | Battery standby time |
| --- | --- | --- |
| 15 ms | 2.188 mA | 5.518 hrs |
| 7.5 ms | 2.335 mA | 5.290 hrs |

As shown in Table 1 above, when the transmission interval length of the sensing data is increased from 7.5 ms to 15 ms, the drain voltage of the processor can be reduced and the battery standby time can be increased.

In some embodiments, when determining the degree of movement or data state of the motion sensing values, the processor 15 can calculate the covariance matrix in the corresponding time interval through a sliding window to determine the degree of variation between the X, Y, and Z axes.

For example, the processor 15 can use the following formula to assemble the covariance matrix:

$$\begin{bmatrix} cov(x, x) & cov(x, y) & cov(x, z) \\ cov(y, x) & cov(y, y) & cov(y, z) \\ cov(z, x) & cov(z, y) & cov(z, z) \end{bmatrix}$$

For another example, the processor 15 can use the following formula to calculate the covariance corresponding to any two variables (taking the X-axis and the Y-axis as an example):

$$cov(x, y) = \frac{1}{N}\sum_{i=1}^{N}((x_i - \bar{x}) \cdot (y_i - \bar{y}))$$

In the above formula, parameter N is the number of samples. The parameter $\bar{x}$ represents the average value of the corresponding x parameter in the time interval, and the parameter $x_i$ is the value of the x parameter corresponding to the i-th time point. The parameter $\bar{y}$ represents the average value of the corresponding y parameter in the time interval, and the parameter $y_i$ is the value of the y parameter corresponding to the i-th time point.

For another example, the processor 15 can calculate the determinant (det) value of the assembled covariance matrix using the following formula:

det value=cov(x,x)*cov(y,y)*cov(z,z)+2*cov(x,y)*cov(y,z)*cov(z,x)−cov(x,x)*cov(y,z)*cov(z,y)−cov(x,y)*cov(y,x)*cov(z,z)−cov(x,z)*cov(y,y)*cov(z,x)

It shall be appreciated that when the determinant value of the covariance matrix is larger, it means that the user is in a relatively strenuous motion state. When the determinant value of the covariance matrix is smaller, it means that the user is in a relatively calm state.

In some embodiments, if the measured motion sensing values are relatively low, the processor 15 can also set the wearable device 1 to a stop state to reduce resource consumption. Specifically, the processor 15 determines whether the motion sensing values are lower than a second threshold to determine that the wearable device 1 is in a stopped state. Next, the processor 15 cuts off the wireless communication connection WC and turns off the motion sensor 11 in response to the wearable device 1 being in the stopped state.

Figure 3:
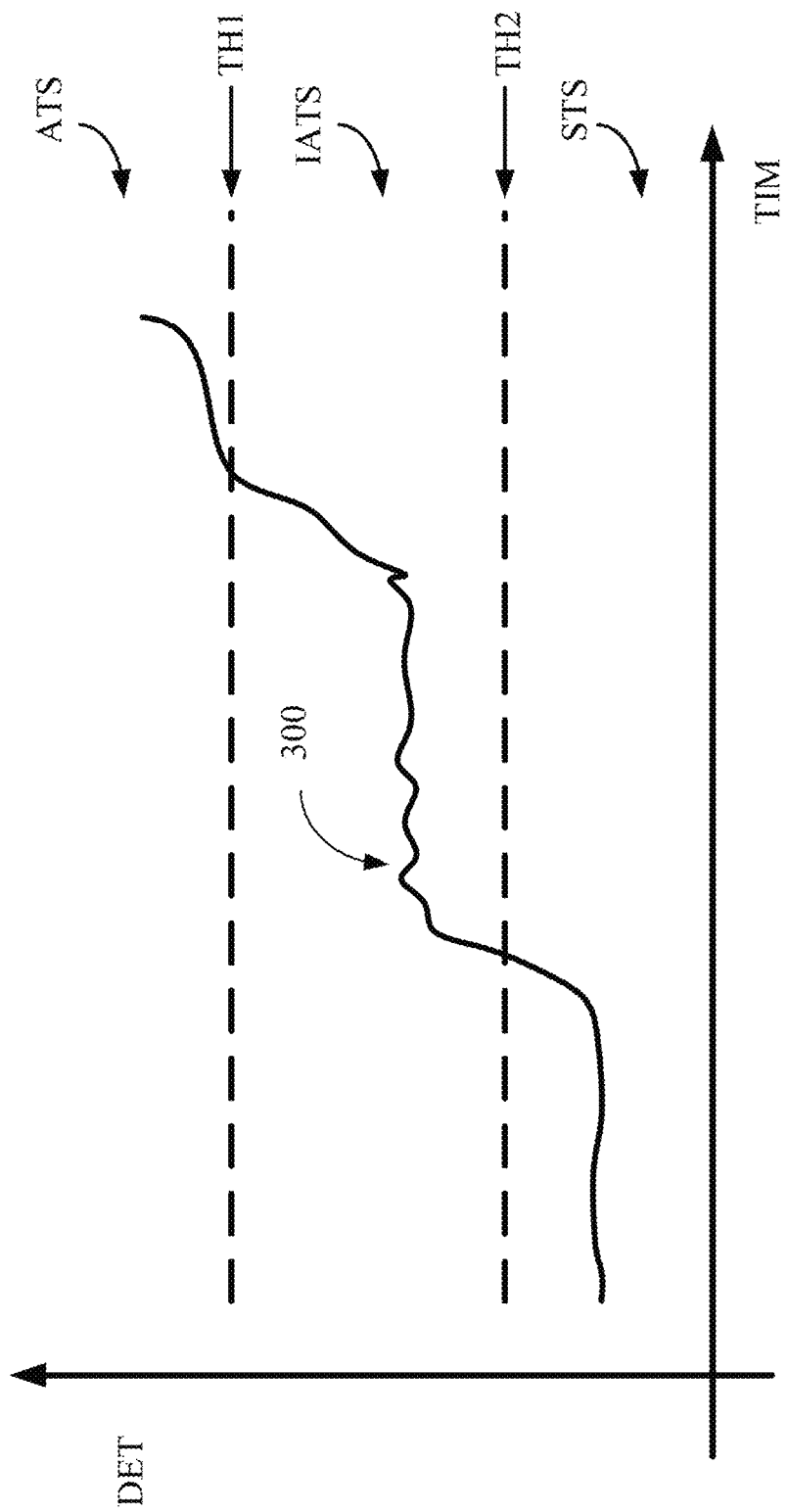
FIG. 3 is a schematic diagram depicting the states of some embodiments.

For ease of understanding, please refer to FIG. 3. FIG. 3 illustrates a schematic diagram of a curve 300 corresponding to the motion sensing values, and the unit of the X-axis is the time TIM and the unit of the Y-axis is the determinant value DET. In the present example, when the values of the motion sensing values exceed the first threshold TH1 (i.e., the curve 300 is located in an area above the first threshold TH1), the wearable device 1 is in the active state ATS.

When the values of the motion sensing values are between the first threshold TH1 and the second threshold TH2 (i.e., the curve 300 is located in the area between the first threshold TH1 and the second threshold TH2), the wearable device 1 is in the inactive state IATS.

When the values of the motion sensing values are lower than the second threshold TH2 (i.e., the curve 300 is located in the area below the second threshold TH2), the wearable device 1 is in the stopped state STS.

In some embodiments, since long-term non-use/uncorrected sensing data will cause parameter drift in the data, the processor 15 can record the last pose of the wearable device 1 before entering the inactive state to avoid parameter drift errors caused by parameter drift in a subsequent period of time.

Specifically, in response to the wearable device 1 being in the active state at a first time point and the wearable device 1 being in the inactive state at a second time point, the processor 15 records a last pose of the wearable device 1 at the first time point, and the first time point and the second time point are a continuous time point, and the first time point is earlier than the second time point.

In some embodiments, the processor 15 can also record the parameter drift values of each axis, and then perform a correction processing on the sensing data through the recorded parameter drift values when determining that the wearable device 1 is in the active state.

In some embodiments, the last pose comprises a projection position and a projection direction of the wearable device 1, and the processor 15 can calculate the accurate projection position and projection direction of the wearable device 1 relative to the external device ED through the last pose.

For example, the user can control the pointer of ray casting through the wearable device 1. In the present example, the last pose may be the last projection position and the last projection direction of the ray pointer projected on the virtual screen (i.e., the projection position and projection direction before the wearable device 1 enters the inactive state).

In some embodiments, the processor 15 can actively position the last pose to the center of the display screen (for example, the display screen of a head-mounted display) after determining that the wearable device 1 is in the active state. Specifically, in response to the wearable device 1 being in the inactive state at the first time point and the wearable device 1 being in the active state at the second time point, the processor 15 re-centers the last pose of the wearable device 1 to a central location of a display screen.

For example, the processor 15 can guide the ray pointer of the ray casting back to the front of the display screen of the head-mounted display through the re-centering operation, so as to facilitate the user to continue subsequent operations.

Figure 2:
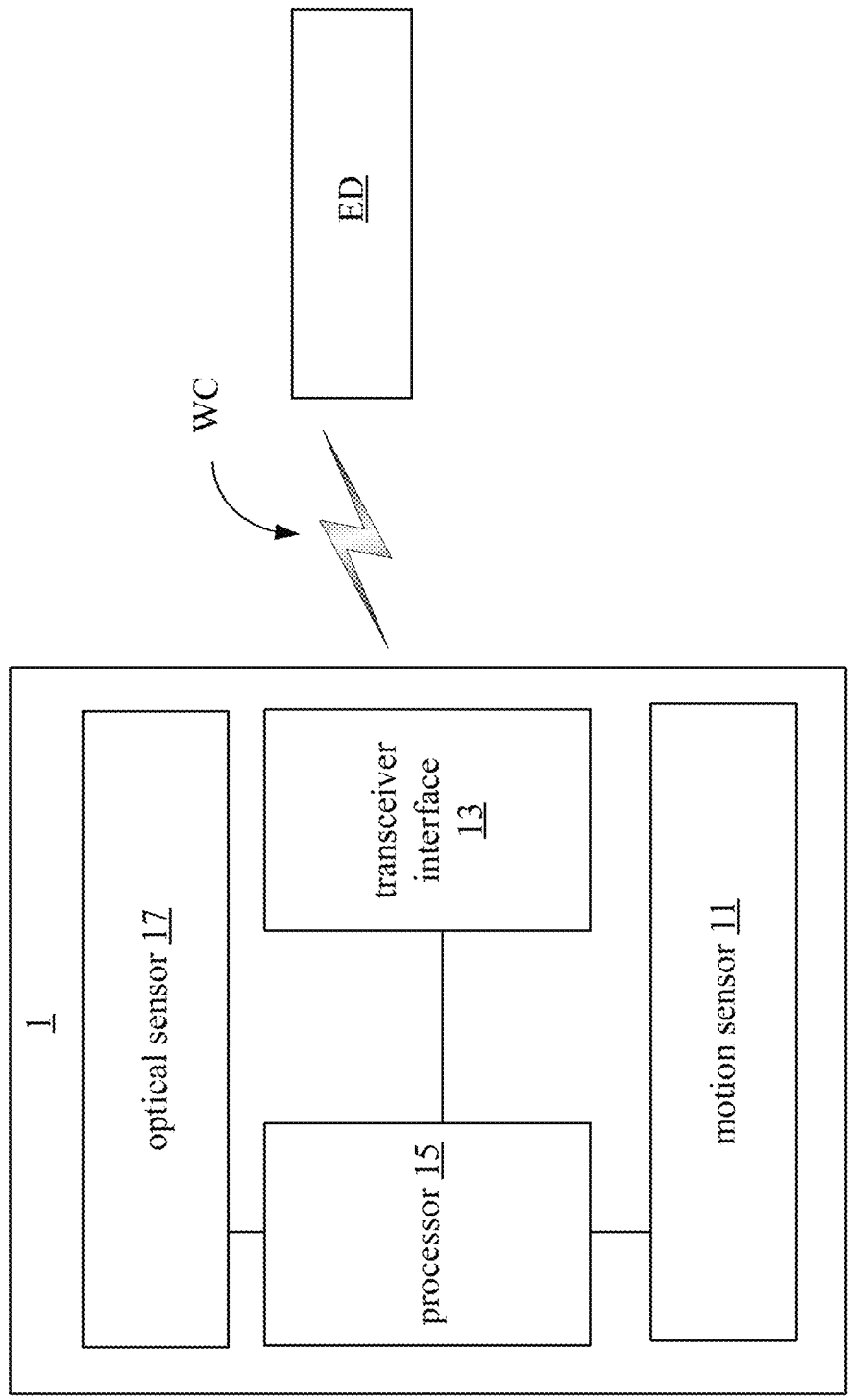
FIG. 2 is a schematic diagram depicting the structure of the wearable device of some embodiments.

In some embodiments, as shown in FIG. 2, the wearable device 1 further comprises an optical sensor 17. The optical sensor 17 is electrically connected to the processor 15, and the optical sensor 17 is configured to generate a plurality of optical sensing values, and the sensing data further comprises the optical sensing values.

For example, the optical sensor 17 can be a sensor capable of operating optical finger navigation (OFN).

It shall be appreciated that the optical sensor 17 can be disposed on a touch screen of the wearable device 1. For example, the optical sensor 17 can be configured to detect the user's input operation, and can be installed on a smart ring worn on the user's index finger, and the user can operate the touch screen through the thumb to perform the input operation.

For example, input operations may include operations such as touch, slide, and stillness.

In some embodiments, the processor 15 may further refer to the data of the optical sensor to dynamically adjust the transmission interval length. Specifically, in response to the wearable device 1 being in the active state, the processor 15 determines a second data state of the motion sensing values and the optical sensing values, wherein the second data state is configured to indicate the frequency of change of the motion sensing values and the optical sensing values. Then, the processor 15 dynamically adjusts the transmission interval length of the sensing data based on the second data state.

For example, when the data of the motion sensor 11 and the optical sensor 17 change relatively frequently (for example, the optical sensor 17 detects that the user's input operation is a touch or slide), the transmission frequency of the sensing data through the wireless communication connection WC is increased (i.e., the transmission interval length of the sensing data is reduced). When the data of the motion sensor 11 and the optical sensor 17 are in a relatively calm motion state, the transmission frequency of the sensing data through the wireless communication connection WC is reduced (i.e., the transmission interval length of the sensing data is increased).

According to the above descriptions, the wearable device 1 provided by the present disclosure determines whether the wearable device 1 is in an active state or an inactive state through the motion sensing value generated by the motion sensor. The wearable device 1 provided in the present disclosure determines whether to transmit sensing data to an external device through a wireless communication connection in response to the wearable device 1 being in the active state or the inactive state. The wearable device 1 provided by the present disclosure can reduce the consumption of transmission resources and computing resources of the wearable device 1 and improve the standby time of the wearable device 1. In addition, since the wearable device 1 provided by the present disclosure does not require restarting the wearable device, the wearable device 1 does not require additional recovery time (For example: the response time of the wearable device 1 can be less than 0.5 seconds), which improves the user's service experience.

Figure 4:
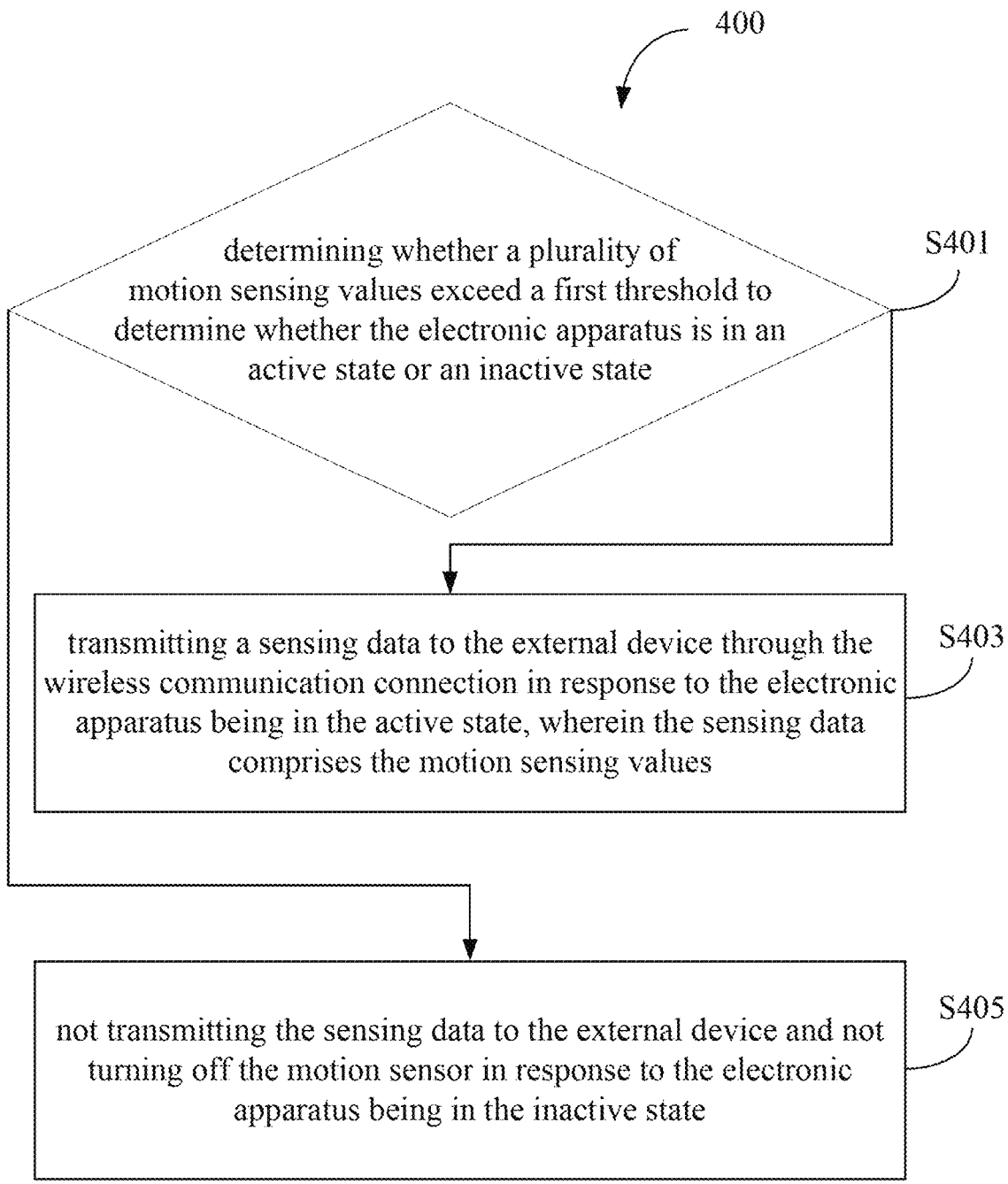
FIG. 4 is a partial flowchart depicting the sensing data transmitting method of the second embodiment.

A second embodiment of the present disclosure is a sensing data transmitting method and a flowchart thereof is depicted in FIG. 4. The sensing data transmitting method 400 is adapted for an electronic apparatus (e.g., the wearable device 1 described in the first embodiment). The electronic apparatus comprises a motion sensor (e.g., the motion sensor 11 described in the first embodiment). The motion sensor is configured to generate a plurality of motion sensing values, and the electronic apparatus is connected to an external device through a wireless communication connection (e.g., the external device ED described in the first embodiment). The sensing data transmitting method 400 determines whether to transmit the sensing data to the external device through the steps S401 to S405.

In the step S401, the electronic apparatus determines whether a plurality of motion sensing values exceed a first threshold to determine whether the electronic apparatus is in an active state or an inactive state.

In response to the electronic device being in the active state, the step S403 is executed. In the step S403, the electronic apparatus transmits a sensing data to the external device through the wireless communication connection in response to the electronic apparatus being in the active state, wherein the sensing data comprises the motion sensing values.

In response to the electronic device being in the inactive state, the step S405 is executed. In the step S405, the electronic apparatus not transmits the sensing data to the external device and not turns off the motion sensor in response to the electronic apparatus being in the inactive state.

In some embodiments, the sensing data transmitting method 400 further comprises the following steps: determining a first data state of the motion sensing values in response to the electronic apparatus being in the active state, wherein the first data state is configured to indicate a frequency of change of the motion sensing values; and dynamically adjusting a transmission interval length of the sensing data based on the first data state.

In some embodiments, the sensing data transmitting method 400 further comprises the following steps: determining whether the motion sensing values are lower than a second threshold to determine that the electronic apparatus is in a stopped state; and cutting off the wireless communication connection and turning off the motion sensor in response to the electronic apparatus being in the stopped state.

In some embodiments, the sensing data transmitting method 400 further comprises the following steps: in response to the electronic apparatus being in the active state at a first time point and the electronic apparatus being in the inactive state at a second time point, recording a last pose of the electronic apparatus at the first time point, wherein the first time point and the second time point are a continuous time point, and the first time point is earlier than the second time point.

In some embodiments, the last pose comprises a projection position and a projection direction of the electronic apparatus.

In some embodiments, the sensing data transmitting method 400 further comprises the following steps: in response to the electronic apparatus being in the inactive state at the first time point and the electronic apparatus being in the active state at the second time point, re-centering the last pose of the electronic apparatus to a central location of a display screen.

In some embodiments, the electronic apparatus further comprises an optical sensor, and the optical sensor is configured to generate a plurality of optical sensing values, wherein the sensing data further comprises the optical sensing values.

In some embodiments, the sensing data transmitting method 400 further comprises the following steps: determining a second data state of the motion sensing values and the optical sensing values in response to the electronic apparatus being in the active state, wherein the second data state is configured to indicate the frequency of change of the motion sensing values and the optical sensing values; and dynamically adjusting the transmission interval length of the sensing data based on the second data state.

In some embodiments, the wireless communication connection is a Bluetooth communication connection.

In addition to the aforesaid steps, the second embodiment can also execute all the operations and steps of the wearable device 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The sensing data transmitting method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the wearable device 1), the computer program executes the sensing data transmitting method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., the threshold, the time point, the data state) are preceded by terms such as "first" or "second", and these terms of "first" or "second" are only used to distinguish these different words. For example, the "first" and "second" data states are only used to indicate the data states used in different operations.

According to the above descriptions, the sensing data transmitting technology (at least including the wearable device, the method, and the non-transitory computer readable storage medium) provided by the present disclosure determines whether the wearable device is in an active state or an inactive state through the motion sensing value generated by the motion sensor. The sensing data transmitting technology provided in the present disclosure determines whether to transmit sensing data to an external device through a wireless communication connection in response to the wearable device being in the active state or the inactive state. The sensing data transmitting technology provided by the present disclosure can reduce the consumption of transmission resources and computing resources of the wearable device and improve the standby time of the wearable device. In addition, since the sensing data transmitting technology provided by the present disclosure does not require restarting the wearable device, the wearable device does not require additional recovery time (For example: the response time of the wearable device 1 can be less than 0.5 seconds), which improves the user's service experience.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wearable device, comprising:
   a motion sensor, being configured to generate a plurality of motion sensing values;
   a transceiver interface, being configured to connect to an external device through a wireless communication connection; and
   a processor, being electrically connected to the transceiver interface and the motion sensor, and being configured to perform the following operations:
   determining whether the plurality of motion sensing values exceed a first threshold to determine whether the wearable device is in an active state or an inactive state;
   transmitting a sensing data to the external device through the wireless communication connection in response to the wearable device being in the active state, wherein the sensing data comprises the motion sensing values; and
   not transmitting the sensing data to the external device and not turning off the motion sensor in response to the wearable device being in the inactive state;
   wherein the processor is further configured to perform the following operations:
   determining a first data state of the motion sensing values in response to the wearable device being in the active state, wherein the first data state is configured to indicate a frequency of change of the motion sensing values; and
   dynamically adjusting a transmission interval length of the sensing data based on the first data state.

2. The wearable device of claim 1, wherein the processor is further configured to perform the following operations:
   determining whether the motion sensing values are lower than a second threshold to determine that the wearable device is in a stopped state; and
   cutting off the wireless communication connection and turning off the motion sensor in response to the wearable device being in the stopped state.

3. The wearable device of claim 1, wherein the processor is further configured to perform the following operations:
   in response to the wearable device being in the active state at a first time point and the wearable device being in the inactive state at a second time point, recording a last pose of the wearable device at the first time point,
   wherein the first time point and the second time point are a continuous time point, and the first time point is earlier than the second time point.

4. The wearable device of claim 3, wherein the last pose comprises a projection position and a projection direction of the wearable device.

5. The wearable device of claim 3, wherein the processor is further configured to perform the following operations:
in response to the wearable device being in the inactive state at the first time point and the wearable device being in the active state at the second time point, re-centering the last pose of the wearable device to a central location of a display screen.

6. The wearable device of claim 1, wherein the wearable device further comprises:
an optical sensor, being electrically connected to the processor, wherein the optical sensor is configured to generate a plurality of optical sensing values, and the sensing data further comprises the optical sensing values.

7. The wearable device of claim 6, wherein the processor is further configured to perform the following operations:
determining a second data state of the motion sensing values and the optical sensing values in response to the wearable device being in the active state, wherein the second data state is configured to indicate the frequency of change of the motion sensing values and the optical sensing values; and
dynamically adjusting the transmission interval length of the sensing data based on the second data state.

8. The wearable device of claim 1, wherein the wireless communication connection is a Bluetooth communication connection.

9. The wearable device of claim 1, wherein the wearable device is a smart ring.

10. A sensing data transmitting method, being adapted for use in an electronic apparatus, wherein the electronic apparatus comprises a motion sensor, the motion sensor is configured to generate a plurality of motion sensing values, the electronic apparatus is connected to an external device through a wireless communication connection, and the sensing data transmitting method comprises the following step:
determining whether the plurality of motion sensing values exceed a first threshold to determine whether the electronic apparatus is in an active state or an inactive state;
transmitting a sensing data to the external device through the wireless communication connection in response to the electronic apparatus being in the active state, wherein the sensing data comprises the motion sensing values; and
not transmitting the sensing data to the external device and not turning off the motion sensor in response to the electronic apparatus being in the inactive state;
wherein the sensing data transmitting method further comprises the following steps:
determining a first data state of the motion sensing values in response to the electronic apparatus being in the active state, wherein the first data state is configured to indicate a frequency of change of the motion sensing values; and
dynamically adjusting a transmission interval length of the sensing data based on the first data state.

11. The sensing data transmitting method of claim 10, wherein the sensing data transmitting method further comprises the following steps:
determining whether the motion sensing values are lower than a second threshold to determine that the electronic apparatus is in a stopped state; and
cutting off the wireless communication connection and turning off the motion sensor in response to the electronic apparatus being in the stopped state.

12. The sensing data transmitting method of claim 10, wherein the sensing data transmitting method further comprises the following steps:
in response to the electronic apparatus being in the active state at a first time point and the electronic apparatus being in the inactive state at a second time point, recording a last pose of the electronic apparatus at the first time point,
wherein the first time point and the second time point are a continuous time point, and the first time point is earlier than the second time point.

13. The sensing data transmitting method of claim 12, wherein the last pose comprises a projection position and a projection direction of the electronic apparatus.

14. The sensing data transmitting method of claim 12, wherein the sensing data transmitting method further comprises the following steps:
in response to the electronic apparatus being in the inactive state at the first time point and the electronic apparatus being in the active state at the second time point, re-centering the last pose of the electronic apparatus to a central location of a display screen.

15. The sensing data transmitting method of claim 10, wherein the electronic apparatus further comprises:
an optical sensor, being configured to generate a plurality of optical sensing values, wherein the sensing data further comprises the optical sensing values.

16. The sensing data transmitting method of claim 15, wherein the sensing data transmitting method further comprises the following steps:
determining a second data state of the motion sensing values and the optical sensing values in response to the electronic apparatus being in the active state, wherein the second data state is configured to indicate the frequency of change of the motion sensing values and the optical sensing values; and
dynamically adjusting the transmission interval length of the sensing data based on the second data state.

17. The sensing data transmitting method of claim 10, wherein the wireless communication connection is a Bluetooth communication connection.

18. A non-transitory computer readable storage medium, having a computer program stored therein, wherein the computer program comprises a plurality of codes, the computer program executes a sensing data transmitting method after being loaded into an electronic apparatus, the electronic apparatus comprises a motion sensor, the motion sensor is configured to generate a plurality of motion sensing values, the electronic apparatus is connected to an external device through a wireless communication connection, and the sensing data transmitting method comprises:
determining whether the plurality of motion sensing values exceed a first threshold to determine whether the electronic apparatus is in an active state or an inactive state;
transmitting a sensing data to the external device through the wireless communication connection in response to the electronic apparatus being in the active state, wherein the sensing data comprises the motion sensing values; and
not transmitting the sensing data to the external device and not turning off the motion sensor in response to the electronic apparatus being in the inactive state;
wherein the sensing data transmitting method further comprises the following steps:
determining a first data state of the motion sensing values in response to the electronic apparatus being in the active state, wherein the first data state is configured to indicate a frequency of change of the motion sensing values; and dynamically adjusting a transmission interval length of the sensing data based on the first data state.

* * * * *